Dec. 30, 1947.  D. E. GRAHAM  2,433,550
MULTIPLE ROD ASSEMBLING AND CLAMPING DEVICE
Filed Sept. 20, 1945
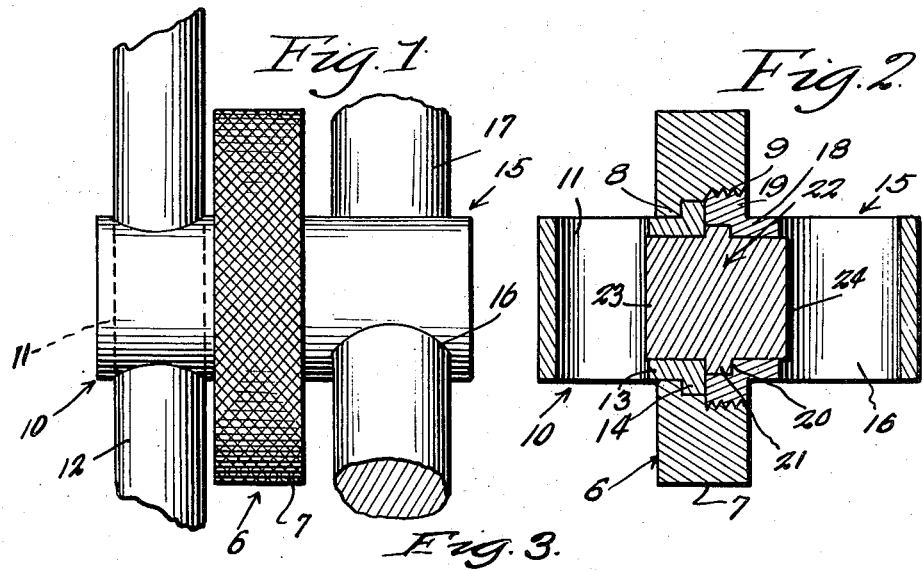
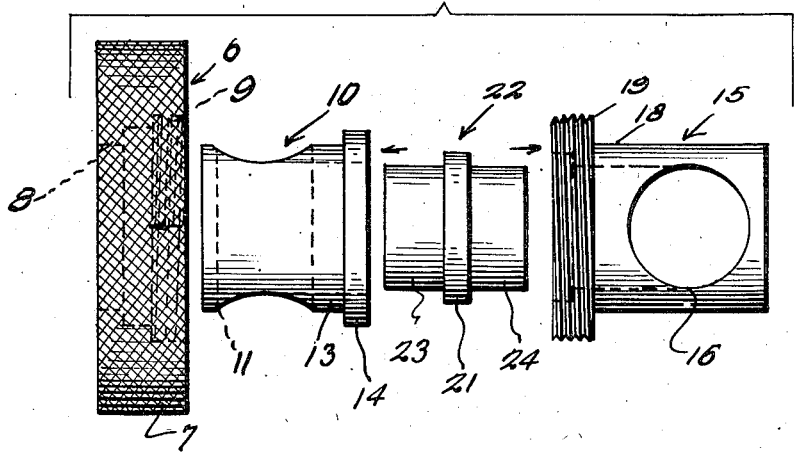
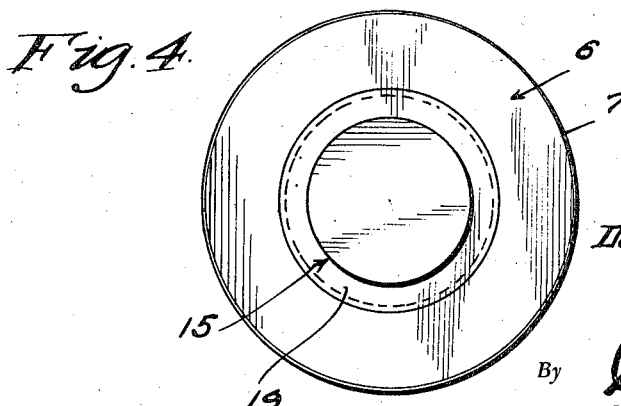
Inventor
DONALD E. GRAHAM
By Clarence A. O'Brien
and Harvey B. Jacobson
Attorneys Patented Dec. 30, 1947

2,433,550

UNITED STATES PATENT OFFICE 2,433,550

MULTIPLE ROD ASSEMBLING AND CLAMPING DEVICE

Donald E. Graham, Madison, Wis.

Application September 20, 1945, Serial No. 617,533

5 Claims. (Cl. 287—54)

This invention relates to what is believed to be a novel and improved assembling and clamping device for complemental rods, the construction being such that said rods are susceptible of adjustment and firm maintenance in relative angular positions in respect to the common axis of said clamping device.

More specifically, the invention has reference to a precision device which permits the respective rods to be arranged in crossed angular relationship in desired relative angular positions and also permits the rods to be longitudinally slipped or shifted for varying purposes and advantages.

I am aware that similar devices in this same general category are not new. Therefore, it is an additional aim to generally, specifically and otherwise improve upon such devices as are known to me, this through the medium of a structural selection and adaptation of parts which are properly designed for mating relationship and with a view toward obtaining desired frictional binding and clamping results.

Other objects, features and advantages will become more readily apparent from the following description and the accompanying illustrative drawings.

In the drawings, wherein like numerals are employed to designate like parts throughout the views:

Figure 1 is an elevational view of a clamping device constructed in accordance with the principles of this invention and showing the manner in which the rods are assembled and held in relative positions.

Figure 2 is a central sectional view through the device with the rods removed.

Figure 3 is an "exploded" view showing all of the individual complemental parts which go to make up the complete device.

Figure 4 is an end elevation of Figure 2, observing the same in a direction from right to left.

Referring now to the drawings by distinguishing reference numerals, it will be seen that the main assembling and hub portion of the structure as a whole is in the form of a ring or nut 6 whose outer peripheral surface is knurled or otherwise roughened to facilitate handling, this as indicated at 7. The central apertured portion of the ring is fashioned on one side to define an endless abutment shoulder 8. The opposite enlarged portion of said aperture is provided with screw threads 9. The numeral 10 designates a sleeve whose bore or passage 11 serves to accommodate the rod 12. This sleeve also includes an annular portion 13 which may be considered as a collar, and this has an outstanding marginal flange 14. Thus, the sleeve 10 is slipped from left to right through the opening in the nut and the flange 14 is brought against the stop and assembling shoulder 8. The companion sleeve, on the opposite side of the nut, is denoted by the numeral 15 and its bore 16 serves to accommodate the second rod 17. Here again the sleeve is formed into an annular collar 18 with an outstanding flange 19 threaded, and also threadedly connected with the threads 9. The collar 18 is formed with a recess at 20, this to accommodate the centrally arranged annular flange 21 on the clamping and binding core or plug 22. The plug is of the length shown in Figure 2 and when the parts are assembled as there illustrated, the end portions 23 and 24 extend into the respective bores 11 and 16 to frictionally engage and bind the rods 12 and 17 in place.

In practice, the sleeve 10 is fitted in place by moving same in the direction of the arrow at the left in Figure 3. Thus the flange 14 is brought into firm contact with the assembling and stop shoulder 8. The two-way clamping and binding plug 22 is slipped into place, one end portion 23 extending through and beyond the annulus or collar 13 and into the bore 11. The flange 21 engages the flanged end of the collar, that is, the flange 14. Then the sleeve 15 is threaded into place, the flange 21 seating itself in the recess 20, and the end portion of the plug extending through and beyond the collar 18 and into the bore 16. When the rods 12 and 17 are put in position, in an obvious manner, the tightening of the parts bind same into the clamping relationship shown in Figure 2. The protruding ends 23 and 24 simultaneously engage the adjacent surfaces of the rods 12 and 17, and frictionally and firmly clamp same in position.

Novelty is predicated on the collared sleeves 10 and 15 disposed in abutting relationship with the two-way clamping plug 22 nested in the collar portions, its protruding ends 23 and 24 accomplishing desired binding and clamping results.

A device of this type is usable in many lines of endeavor, and therefore I am not attempting to enumerate the various uses here.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. An assembling and clamping device for a pair of companion but separate rods, said device serving to hold said rods in different angularly adjusted positions in the manner shown and described and comprising a hub-forming and coupling ring, a pair of complemental rod adapter fittings mounted in said ring and disposed in axial alignment with one another, the outer end portions of the respective fittings projecting beyond opposite faces of said coupling ring, said fittings being provided at their respective inner ends with collars, said collars being in abutting relationship and adjustable in respect to the ring, the protruding outer end portions of said fittings being provided with rod passages, the respective passages being parallel to each other and at approximate right angles to the axial center of said coupling ring, rods mounted for sliding movement in the passages, and a single, double acting clamping element mounted shiftably in said collars and having opposite end portions projecting into said passages and having pressure-clamping contact with said rods.

2. The structure specified in claim 1, one of said collars having an annular groove forming a keyway, said clamping element having an annular flange forming a key, and said key fitting into said keyway.

3. A rod assembling, mounting, and clamping device of the class described comprising a hub-forming and coupling ring adapted for central location in respect to complemental elements and having an axially centered passage, said passage being provided at one side of said ring with shoulder means, a rod adapter fitting projecting through and beyond said one side of the ring and having a collar at its inner end lodged in said passage, said collar having an outstanding flange and said flange abutting said shoulder means, a second rod adapter fitting, said fitting having a collar at its inner end and an outstanding screw-threaded flange on said collar, said passage having one end portion internally screw-threaded and said screw-threaded flange being adjustably and removably screwed into said screw-threaded portion, and a single, double acting plug-like member mounted in said collar, the outer ends of said fittings having rod bores and said bores being at right angles to the axial center of said passage, and the respective outer ends of said plug-like member projecting into said bores, in the manner and for the purposes described.

4. The structure specified in claim 3, said plug-like member having, intermediate its ends, an outstanding assembling and retaining flange, said flange abutting the flange on the first-named collar, and said second-named collar having a groove in which the flange on said plug-like member is removably keyed.

5. In an assemblage of the class described, a rod fitting having a flanged collar at one end and a rod passage at the opposite end, the rod passage being with its axis at right angles to the central axis of the collar, a plug-like clamping element having one end portion telescoping into said collar, and having an outstanding flange intermediate its ends, a second rod fitting, said fitting having a collar at its inner end, said collar having a groove for reception of the flange on said plug-like member, and said flange being externally screw-threaded, the outer end portion of said second fitting having a bore and said bore being at right angles to the axial center of said second-named collar, and a coupling member securing the flanges of the respective fittings adjustably and separably together.

DONALD E. GRAHAM.

REFERENCES CITED

The following references are of record in the file of this patent:

UNITED STATES PATENTS

| Number | Name | Date |
|---|---|---|
| 1,615,536 | Del Mar | Jan. 25, 1927 |
| 551,358 | Benecke | Dec. 17, 1895 |
| 1,137,333 | Klorer | Apr. 27, 1915 |
| 1,217,960 | Klorer | Mar. 6, 1917 |
| 1,267,959 | Becker | May 28, 1918 |
| 1,408,834 | Seavey | Mar. 7, 1922 |
| 1,469,448 | Seavey | Oct. 2, 1923 |
| 1,901,168 | Kalben | Mar. 14, 1933 |
| 2,310,276 | Bitz | Feb. 9, 1943 |
| 2,365,935 | Boggs | Dec. 26, 1944 |

FOREIGN PATENTS

| Number | Country | Date |
|---|---|---|
| 349,019 | France | May 8, 1905 |
| 644,284 | France | Oct. 5, 1928 |